United States Patent [19]
Wleklinski

[11] Patent Number: 5,186,309
[45] Date of Patent: Feb. 16, 1993

[54] TRANSFER STATION FOR TRANSFERRING MATERIAL BETWEEN CONVEYORS IN A MINE WORKING

[75] Inventor: Bernhard Wleklinski, Werne, Fed. Rep. of Germany

[73] Assignee: Westfalia Becorit Industritechnik GmbH, Lunen, Fed. Rep. of Germany

[21] Appl. No.: 797,698

[22] Filed: Nov. 25, 1991

[30] Foreign Application Priority Data

Nov. 30, 1990 [DE] Fed. Rep. of Germany ....... 4038230

[51] Int. Cl.$^5$ ............................................ B65G 15/24
[52] U.S. Cl. .................................. 198/606; 198/735.4; 198/834
[58] Field of Search ..................... 198/735.4, 606, 607, 198/834

[56] References Cited

U.S. PATENT DOCUMENTS

| | | | |
|---|---|---|---|
| 780,367 | 1/1905 | Metten | 198/735.4 X |
| 2,340,783 | 2/1944 | Wegner | 198/735.4 X |
| 3,620,350 | 11/1971 | Cheek | 198/735.4 X |
| 3,685,367 | 8/1972 | Dawson | 198/834 |
| 4,049,112 | 9/1977 | Tyslauk | 198/834 |
| 4,471,868 | 9/1984 | Buschbom et al. | 198/735.4 |
| 4,673,079 | 6/1987 | Gründken et al. | 198/606 X |
| 4,766,992 | 8/1988 | Braun et al. | 198/606 X |

FOREIGN PATENT DOCUMENTS

| | | | |
|---|---|---|---|
| 2600999 | 7/1977 | Fed. Rep. of Germany | 198/606 |
| 1463764 | 2/1977 | United Kingdom | 198/606 |

Primary Examiner—D. Glenn Dayoan
Assistant Examiner—Cheryl L. Gastineau
Attorney, Agent, or Firm—Samuels, Gauthier & Stevens

[57] ABSTRACT

A transfer station for transfer of material from a longwall face to a gate or roadway of a mine working employs a box frame in which the two runs of a scraper-chain face and gate conveyors intersect. A driving drum for the face conveyor is mounted in a housing in the box frame. A baffle plate cover in the form of a pivotal flap which can be locked in the closed position is arranged on an end face of the housing receiving the chain drum. The pivotal flap preferably consists of two flap doors which can be hinged outwardly on opposing sides so that the chain drum is accessible from the exterior.

11 Claims, 3 Drawing Sheets

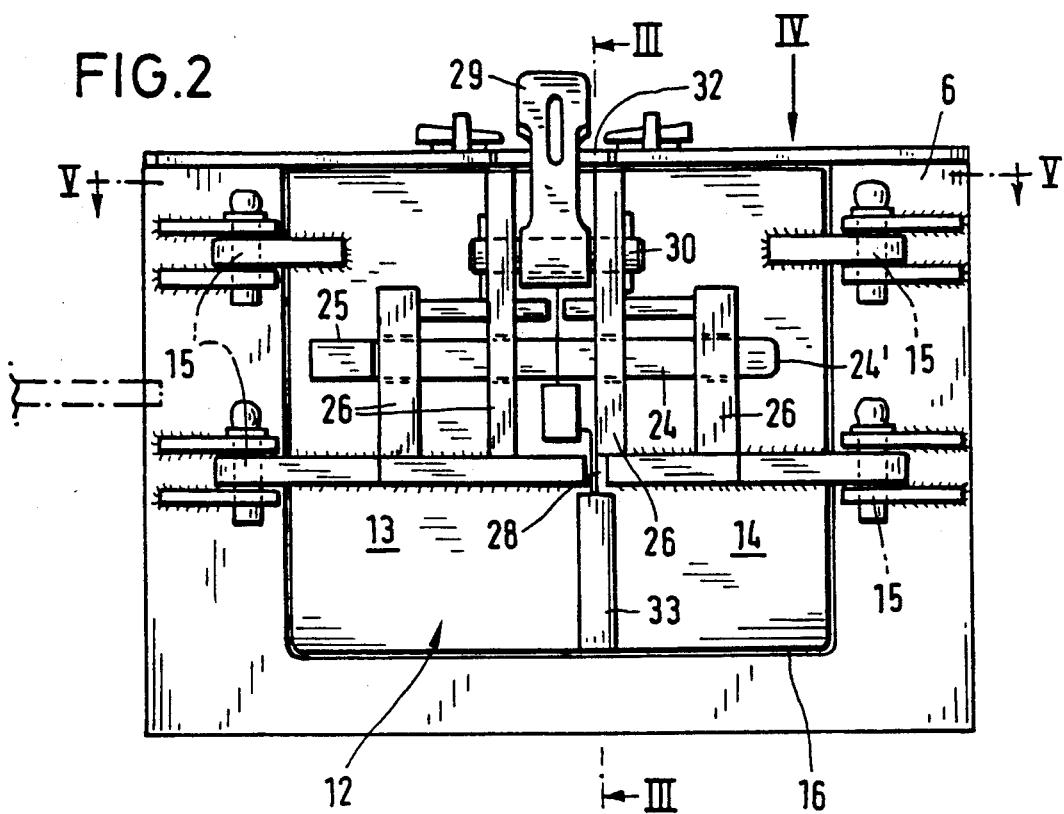
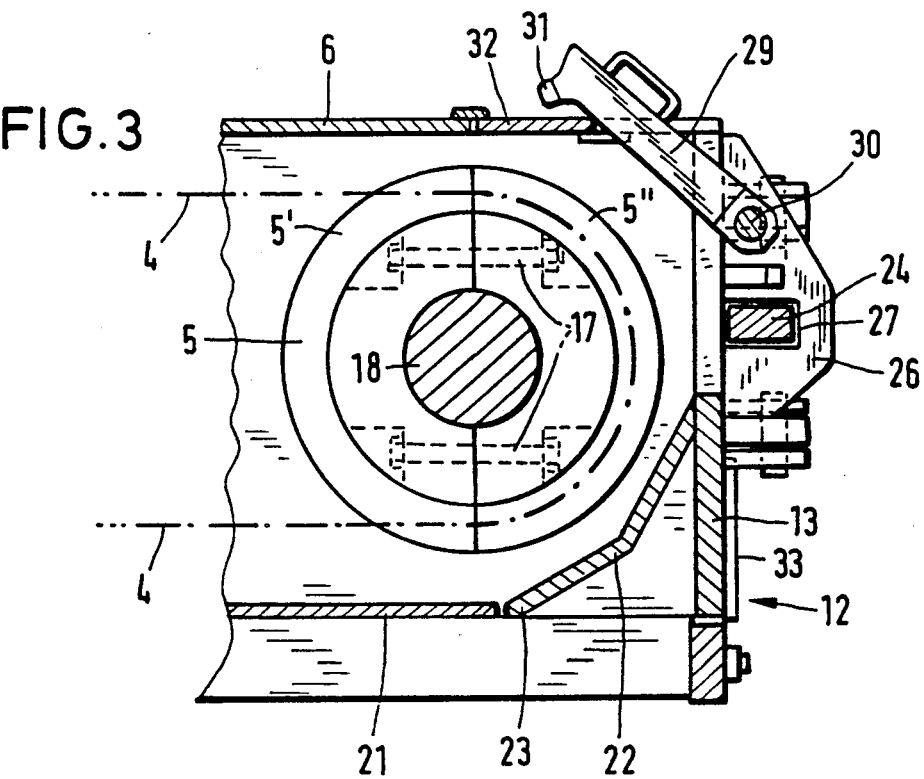

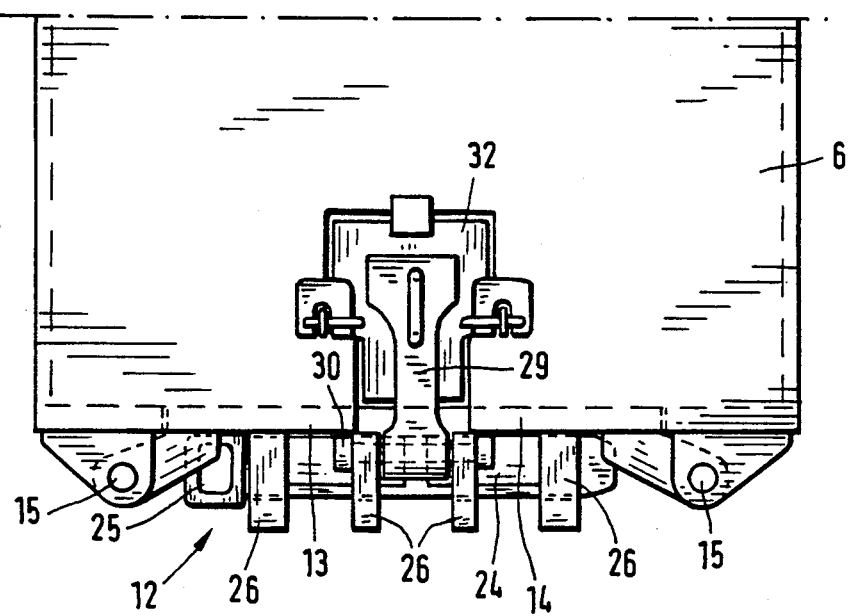
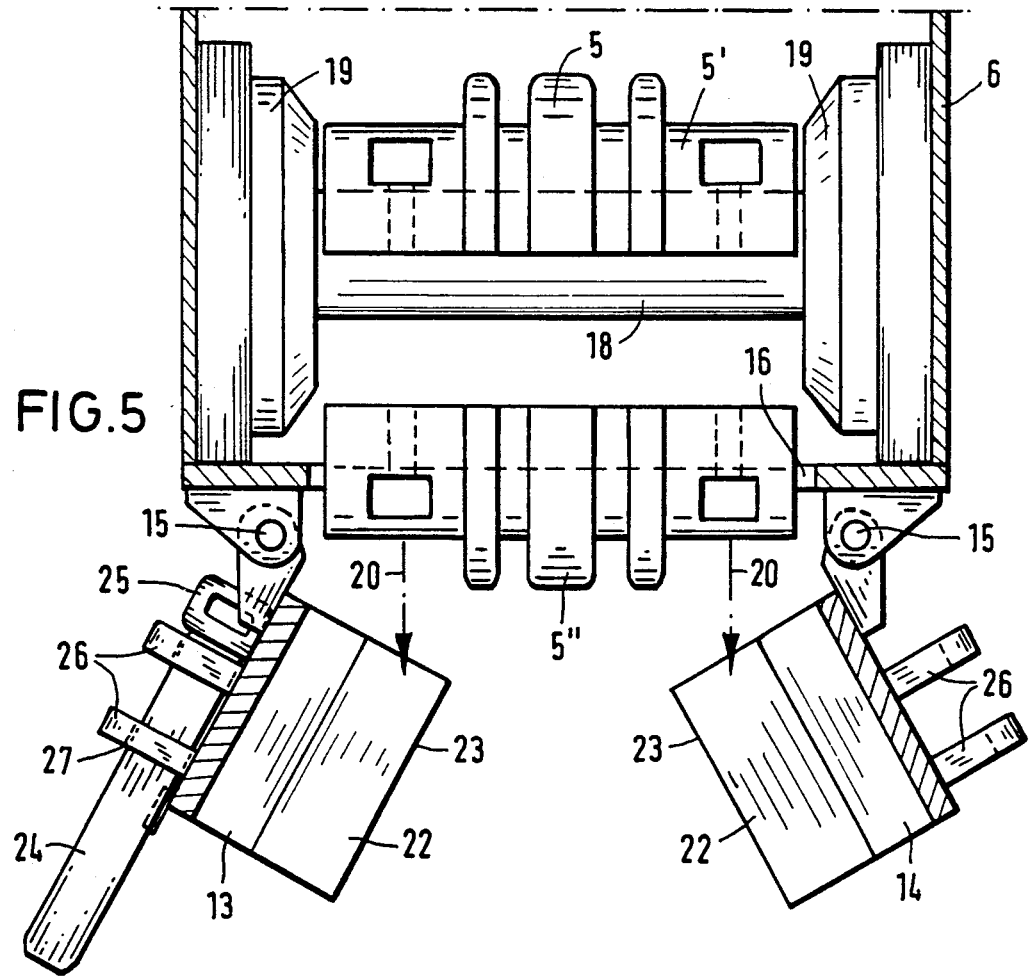

TRANSFER STATION FOR TRANSFERRING MATERIAL BETWEEN CONVEYORS IN A MINE WORKING

FIELD OF THE INVENTION

The present invention relates to a transfer station for use in underground mines where material is transferred from a scraper-chain face conveyor to a scraper-chain gate or roadway conveyor. As is known, scraper-chain conveyors are constructed from channel sections or pans disposed end-to-end and each composed of a floor plate or tray extending between profiled side walls. A scraper-chain assembly is circulated along the pans in upper and lower runs above and below the floor plates.

BACKGROUND TO THE INVENTION

A transfer station is known in which a box frame connects a scraper-chain face conveyor a scraper-chain gate conveyor. The top run of the gate conveyor is arranged below the top run of the face conveyor. The face conveyor has an opening in the floor or tray for allowing material to pass to the top run of the gate conveyor. A baffle plate cover, arranged in front of a chain drum of the face conveyor serves to convey any fines entrained by the scraper-chain assembly of the face conveyor from the top run into the bottom run of the face conveyor. Transfer stations of this type are known from U.S. Pat. No. 4,673,079, DE-PS 26 00 999 and U.S. Pat. No. 4,766,992. The box frame forms the common machine frame of the face conveyor and of the gate conveyor extending transversely thereto. The material is discharged from the face conveyor into the gate conveyor inside the box frame. The individual runs of the face conveyor and of the gate conveyor are arranged so as to intersect alternately within the box frame so that the top run of the gate conveyor is located between the top run and the bottom run of the face conveyor. Material is discharged from the top run of the face conveyor via the opening in the conveying floor or tray thereof into the top run of the gate conveyor located directly below it, optionally with the assistance of a fender. Any fines which are entrained by the scraper chain assembly of the face conveyor over the opening in its tray are conveyed at the chain drum of the face conveyor via the baffle plate cover into the bottom run thereof and are discharged here via an opening in the floor or tray of the bottom run into the closed bottom run of the gate conveyor so that they can be raised into the top run thereof via the reversal of the gate conveyor and can be carried off therein together with the remaining material. The driven chain drum of the face conveyor is mounted in the box frame or in an attachable housing thereof and is surrounded by the baffle plate cover.

During use, the chain drum of the face conveyor and the space receiving it must be accessible for maintenance or cleaning purpose, for example for eliminating blockages at the transfer station from the top run to bottom run of the face conveyor. This can be achieved by designing the baffle plate cover as a screwed-on mounting plate. The effort involved in releasing the screw connections, removing the baffle plate and screwing it on again is considerable and the cramped conditions in a typical mine working aggravate the situation.

An object of the invention is to modify the design of the transfer station simply such that the chain drum of the face conveyor and the space receiving it is easily accessible from the exterior at any time without difficulties and without complicated mounting work.

SUMMARY OF THE INVENTION

According to the invention the baffle plate cover is constructed as a pivoting flap means which can be locked in the closed position.

The pivoting flap means forms not only a closure element but at the same time also the baffle plate for the fines which are entrained by the scraper-chain assembly via the chain drum thereof and are deflected at the chain drum into the bottom run of the face conveyor so that they can be discharged here into the gate conveyor. The opening and closure of the pivoting flap means after release of its lock makes the chain drum of the face conveyor and the space receiving the chain drum at the box frame easily accessible from the exterior at any time without the baffle plate cover having to be completely dismantled and removed.

The pivoting flap means can be constructed in one part or several parts. The means preferably consists of two individual door flaps which are hinged outwardly on opposite sides. This design of the pivoting means allows particularly simple mounting and actuation thereof.

The opening, which can be closed by the pivoting flap means can be disposed on the end face of a housing part of the box frame receiving the chain drum of the face conveyor and preferably has a width which is greater than the length of the chain drum which, in a known manner, consists of shells or half sections which can be screwed to one another. This allows the divided chain drum of the face conveyor to be fitted and removed when the pivoting flap means is opened and to be exchanged rapidly when worn.

It is also advisable to construct the aforementioned opening such that it extends from the level of the top run roughly to the underside of the bottom run of the face conveyor. This allows blockages in the deflection region and also in the bottom run region of the chain drum to be removed without difficulty.

In a further advantageous design of the invention, a baffle plate element surrounding the chain drum with spacing in the lower region is rigidly arranged on the pivoting flap means or on each door flap thereof and assists the deflection of the fines into the bottom run of the face conveyor.

A strong securing lock is preferably provided for locking the pivoting flap means. If the pivoting flap means is sub-divided, the two resultant door flaps can be provided, on their exterior, with lock holders for a horizontally displaceable securing lock.

It is also advisable to provide one of the two door flaps with a stop or sealing strip which closes the joint between the two door flaps and against which the other door flap can be placed in the closed position. Reliable sealing of the fines is therefore also guaranteed at the closing joint of the two door flaps.

Finally, it is also possible to mount a catch pivotally on the pivoting flap, with which the scraper-chain assembly can be fixed on the chain drum during the tensioning process. The scraper-chain assembly is tensioned in a known manner by means of a tensioning motor arranged on the chain drive of the face conveyor, by means of which the scraper-chain assembly fixed at one end by the catch can be sensitively driven. If the pivoting flap means is divided, the catch is preferably detachably mounted in pivot bearings of the two door flaps so that it can be removed for opening the door flaps.

The invention may be understood more readily and various other aspects and features of the invention may become apparent from consideration of the following description.

BRIEF DESCRIPTION OF DRAWINGS

An embodiment of the invention will now be described, by way of example only, with reference to the accompanying drawings, wherein

FIG. 2 is an end view of the transfer station taken in the direction of line II—II in FIG. 1, the view being taken on a somewhat larger scale;

FIG. 3 is a sectional view of part of the transfer station taken along the line III—III of FIG. 2;

FIG. 4 is a plan view of a housing of a box frame of the transfer station the view being taken in the direction of arrow IV of FIG. 2; and FIG. 5 is a sectional plan view taken along the line V—V of FIG. 2, in which the door flaps are shown partially pivoted out.

DESCRIPTION OF PREFERRED EMBODIMENTS

Figure 1:
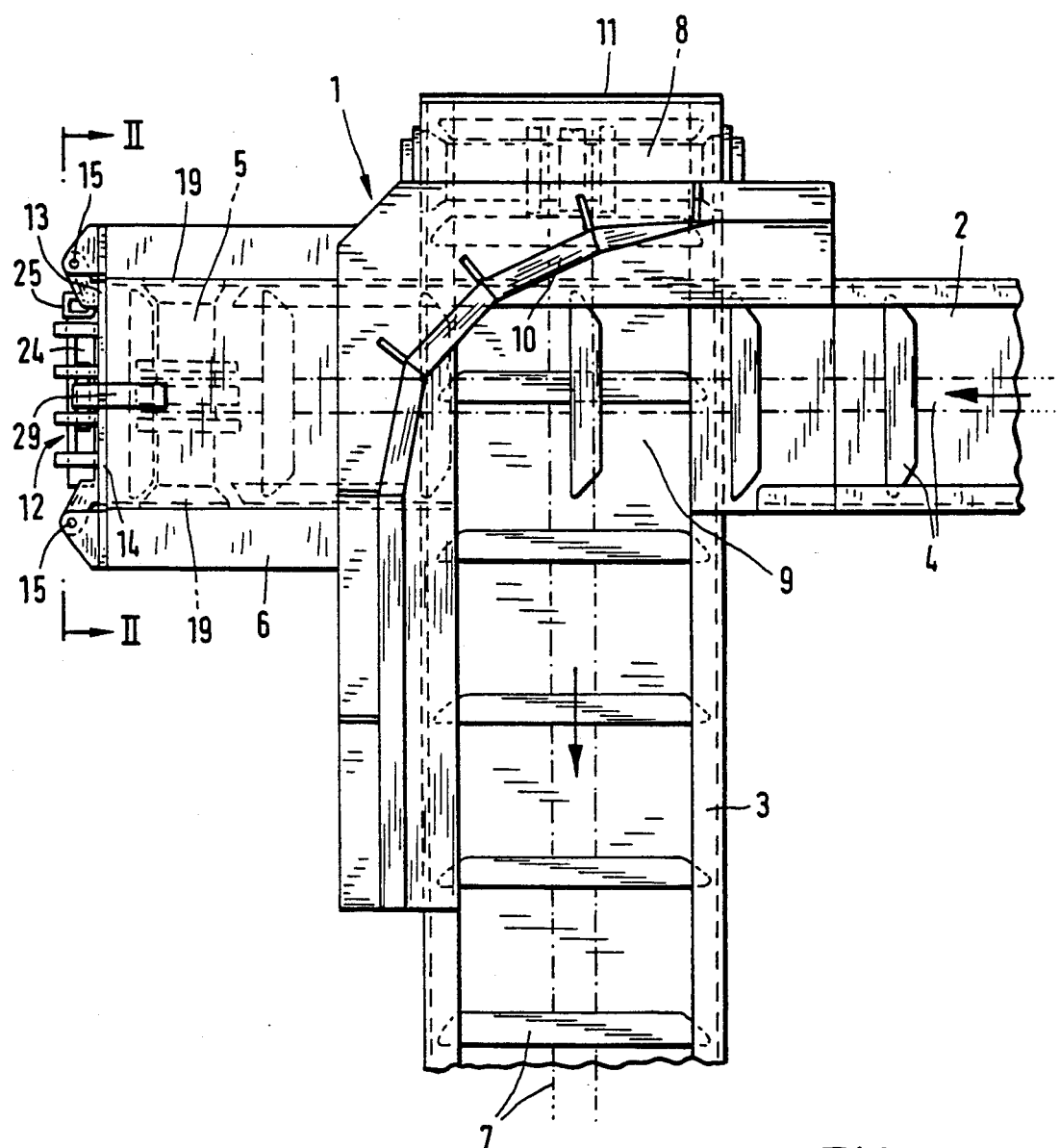
FIG. 1 is a schematic simplified plan view of a transfer station constructed in accordance with the invention.

The basic design of the station transfer illustrated in the drawings is known from U.S. Pat. No. 4,673,079, the disclosure of which is herein incorporated by reference. The transfer station essentially has a box frame 1 which forms a common machine frame for a scraper-chain face conveyor 2 and a scraper-chain gate or roadway conveyor 3 extending substantially perpendicularly thereto. The face conveyor 2 and the gate conveyor 3 each consist of a scraper-chain conveyor, preferably of the inboard type chain assembly, say as illustrated with a double central chain scraper-chain assembly. The conveying directions of the face conveyor 2 and of the gate conveyor 3 are indicated by arrows in FIG. 1. The discharge end of the face conveyor 2 is connected to the reversal end of the gate conveyor 3 via the box frame 1. The point of intersection of the two conveyors 2 and 3 formed by the box frame 1 enables material to be discharged from the face conveyor 2 onto the gate conveyor 3.

The scraper chain assembly 4 of the face conveyor 2 is guided through the box frame 1 in the top run and the bottom run thereof and runs over a chain drum 5 which is mounted in a housing 6 of the box frame 1. The chain drum drive is not illustrated. The housing 6 receiving the chain drum 5 is located on the side of the box frame 1 remote from the longwall face.

The scraper chain assembly 7 of the gate conveyor 3 is also guided through the box frame 1 in the top run and bottom run and is deflected over a reversing drum 8 mounted in the box frame from the top run into the bottom run. Inside the box frame 1, the conveyor floor or tray of the face conveyor 2 is completely or partially removed so that the material conveyed by the scraper chain assembly 4 in the top run of the face conveyor 2 in the box frame 1 falls through an opening 9 in the tray into the top run of the gate conveyor 3 and is carried off therein in the direction of the arrow. Relatively large pieces of broken material, for example chunks of coal and the like are deflected laterally into the gate conveyor 3 by a fender 10 passing over the top run of the face conveyor 2 on the box frame 1.

In the box frame 1, the conveying top run of the gate conveyor 3 is located between the conveying top run of the face conveyor 2 and the bottom run of the face conveyor 2. Any fines which are entrained by the scraper chain assembly 4 over the opening 9 in the tray are deflected at the chain drum 5 into the bottom run of the face conveyor 2, conveyed back in the closed bottom run of the face conveyor 2 and discharged via an opening in the tray in the bottom run of the face conveyor 2 at the box frame 1 into the bottom run of the gate conveyor 3 so that it is conveyed in bottom run of the gate conveyor 3 by the scraper chain assembly 7 back to the drum 8 and is raised via the drum 8 into its top run and therefore carried off together with the remaining material in the gate conveyor 3. A baffle plate 11 is arranged in front of the chain drum 8 and a baffle plate cover 12 in front of the chain drum 5 of the face conveyor for deflecting the fines in the chain drum regions.

The baffle plate cover 12 is designed as a pivoting flap means which can be locked in its closure position and can then be pivoted outwardly in the unlocked state so that the chain drum 5 is accessible from the exterior. As shown in particular by FIGS. 2 to 5, the pivoting flap means forming the baffle plate cover 12 is divided vertically. It consequently consists of two flap doors 13 and 14 which can be pivoted outwardly on strong pin-type hinges 15 on the end face of the housing 6 to the opposite sides. The opening 16, which can be closed by the pivoting flap means e.g. the two doors 13 and 14 on the end face of the housing 6, receiving the chain drum 5, of the box frame 1 is designed so as to be roughly rectangular in outline and has a width which is greater than the length of the chain drum 5. In a known manner, the chain drum 5 consists of two half sections or half shells 5' and 5" which are detachable connected to one another by screws 17 (FIG. 3). The shells 5',5" are rotationally mounted on a chain drum shaft 18 which, as shown in FIG. 5, is mounted in bearing pots 19 on the lateral cheeks of the housing 6. After release of the screw connection 17, therefore, the two half sections 5' and 5" of the chain drum 5, can be removed in the direction of the arrow 20 when the flap doors 13 and 14 are in the open position. Simple installation and removal and simple exchange of the chain drum 5 is therefore also possible.

As shown, in particular, in FIG. 3, the height of the opening 16 is dimensioned such that it extends from the upper side of the housing 6, i.e. roughly from the level of the top run roughly to the underside of the bottom run of the face conveyor 2. The bottom run has a bottom run cover 21. It is consequently also possible to eliminate any blockages in the peripheral region of the chain drum 5 and in the transfer region between the chain drum 5 and the bottom run of the face conveyor 2 when the flap doors 3 are open.

As shown in FIGS. 3 and 5, a baffle plate element 22 is fastened internally on each flap door 13 and 14, for example by welding. These elements 22 surrounding the chain 5 with spacing in the lower region and in the closed state of the flap doors 13 and 14 have free front edges 23 roughly aligned with the front edge of the bottom run cover plate 21. In the closed state, consequently, the flap doors 13 and 14 with the baffle plate elements 22 have the function of a simple baffle plate surrounding the chain drum 5 with spacing so that any fines entrained by the scraper assembly 4, and not falling through the opening 9 in the tray into the gate conveyor 3, are conveyed via the chain drum 5 into the bottom run of the face conveyor 2 and conveyed here back to a point at which they are discharged in the box frame 1 into the bottom run of the gate conveyor 3.

A securing lock 24 in the form of a strong bolt having a grip 25 at its end is provided for locking the two flap doors 13 and 14 in the closed position according to FIGS. 1 to 4. The two flap doors 13 and 14 each have, at their exterior, welded-on lock holders 26 with lock openings 27 into which the securing lock 24 can be introduced so that it locks the two flap doors 13 and 14 in the closed position. In order to open the flap doors 13 and 14, the securing lock 24 can be removed laterally from the openings 27 of the lock holders 26. Instead, the securing lock 24 can however also be pulled back to the left with the grip end 25 according to FIG. 2 until its free end 24 is located outside the lock openings 27 of the lock holder 26 arranged on the door 14. When the securing lock 24 remains in the lock holders 26 of the other door 13, the two flap door 13 and 14 can be pivoted outwardly.

It is advisable to fasten a stop or sealing strip 33 on one of the two flap doors 13 or 14, preferably the door 14. This strip 33 seals the closure joint 28 between the two flap doors 13,14 against the penetration of fines. The sealing strip 33, is fastened on the free vertical edge of the respective flap door 13,14 such that the other flap door, preferably the flap door 13, is placed with its free vertical face edge against the sealing strip 33 when the door flap 13 is pivoted into the closure position. Such closure joint seals are known with either a right-hand or left hand stop for the doors.

A catch 29 is pivotally mounted in a pin-type hinge 30 in the upper region on the two flap doors 13 and 14 in the embodiment illustrated. The hinge pin of the pin-type hinge 30 passes through pin openings on the lock holders 26, formed by ribs located parallel to one another on the two flap doors 13 and 14. The catch 29 has a catch nose 31 at its free end. A removable closure plate 32 is located in the upper region on the housing 66. After removal of the closure plate 32, therefore, the catch 29 can be pivoted inwardly toward the chain drum 5 so that its catch nose 31 enters a horizontal chain link of the scraper-chain assembly 4 located in the chain wheel teeth of the chain drum 5 and therefore fixes the scraper-chain assembly 4. The scraper-chain assembly 4 can be tensioned in a known manner by means of the tensioning motor allocated to the chain drum drive. To enable the doors 13 and 14 to be opened, the catch 29 is simply removed by releasing the hinge pin 30. When the chain is tensioned, the high forces are offset via the catch 29 onto the flap doors 13 and 14 which are locked to one another.

I claim:

1. Transfer station for transfer of material from a longwall face to a gate or roadway in an underground mine working; said station comprising at least part of a scraper-chain face conveyor for conveying material along the face, at least part of a gate scraper-chain conveyor for taking material from the face conveyor and transferring the material away from the face, a box frame which connects the face conveyor to the gate conveyor and in which a top run of the gate conveyor is arranged below a top run of the face conveyor, an opening in the face conveyor between the top run of the face conveyor and the top run of the gate conveyor, a chain drum around which a scraper-chain assembly of the face conveyor passes, a baffle plate cover in the form of pivotal flap means confronting the chain drum of the face conveyor for promoting the removal and conveying of fines material entrained by the scraper-chain assembly of the face conveyor from the top run into a bottom run of the face conveyor, means for locking the flap means in a closed position adjacent the chain drum and a baffle plate element surrounding the chain drum with spacing which is arranged internally in the lower region of the pivotal flap means.

2. Transfer station according to claim 1, wherein the pivotal flap means is divided vertically and consists of two flap doors hinged outwardly at opposing sides.

3. Transfer station according to claim 1 wherein a catch is pivotally mounted as a chain catching device on the pivotal flap means.

4. Transfer station for transfer of material from a longwall face to a gate or roadway in an underground mine working; said station comprising at least part of a scraper-chain face conveyor for conveying material along the face, at least part of a gate scraper-chain conveyor for taking material from the face conveyor and transferring the material away from the face, a box frame which connects the face conveyor to the gate conveyor and in which a top run of the gate conveyor is arranged below a top run of the face conveyor, an opening in the face conveyor between the top run of the face conveyor and the top run of the gate conveyor, a chain drum around which a scraper-chain assembly of the face conveyor passes, a baffle plate cover in the form of pivotal flap means confronting the chain drum of the face conveyor for promoting the removal and conveying of fines material entrained by the scraper-chain assembly of the face conveyor from the top run into a bottom run of the face conveyor and means for locking the flap means in a closed position adjacent the chain drum; wherein the pivotal flap means is divided vertically and consists of two flap doors hinged outwardly at opposing sides.

5. Transfer station according to claim 4 wherein an opening which can be closed by the pivotal flap means has a width on an end face of a housing of the box frame receiving the chain drum of the face conveyor which is greater than the length of the chain drum which is composed of sections, screwed to one another.

6. Transfer station according to claim 5 wherein the opening which can be closed by the pivotal flap means extends approximately from the level of the top run to the underside of the bottom run of the face conveyor.

7. Transfer station according to claim 4 and further comprising a baffle plate element surrounding the chain drum with spacing is arranged internally in the lower region of the pivotal flap means.

8. Transfer station according to claim 4 wherein the two flap doors are provided on their exterior with lock holders for receiving a displaceable securing lock.

9. Transfer station according to claim 4 wherein the two flap doors are provided with a stop/sealing strip establishing a closure joint between the two flap doors.

10. Transfer station according to claim 4 wherein a catch for the scraper-chain assembly is detachably mounted in a pivot bearing on the two flap doors.

11. Transfer station for transfer of material from a longwall face to a gate or roadway in an underground mine working; said station comprising at least part of a scraper-chain face conveyor for conveying material along the face, at least part of a gate scraper-chain conveyor for taking material from the face conveyor and transferring the material away from the face, a box frame which connects the face conveyor to the gate conveyor and in which a top run of the gate conveyor is arranged below a top run of the face conveyor, an opening in the face conveyor between the top run of the face conveyor and the top run of the gate conveyor, a chain drum around which a scraper-chain assembly of the face conveyor passes, a baffle plate cover in the form of a pivotal flap means confronting the chain drum of the face conveyor for promoting the removal and conveying of fines material entrained by the scraper-chain assembly of the face conveyor from the top run into a bottom run of the face conveyor, means for locking the flap means in a closed position adjacent to the chain drum; and a catch pivotably mounted as a chain catching device on the pivotable flap means.

* * * * *